United States Patent
Kronmueller (10) Patent No.: US 9,766,882 B2
(45) Date of Patent: Sep. 19, 2017

(54) COMPUTER-IMPLEMENTED METHOD FOR EDITING DATA OBJECT VARIANTS

(71) Applicant: dSPACE digital signal processing and control engineering GmbH, Paderborn (DE)

(72) Inventor: Martin Kronmueller, Salzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 14/794,331

(22) Filed: Jul. 8, 2015

(65) Prior Publication Data

US 2017/0010887 A1     Jan. 12, 2017

(51) Int. Cl.
*G06F 9/44*        (2006.01)
*G05B 19/418*     (2006.01)

(52) U.S. Cl.
CPC .......... *G06F 8/70* (2013.01); *G05B 19/41885* (2013.01); *G06F 9/4433* (2013.01); *G06F 9/4436* (2013.01)

(58) Field of Classification Search
CPC ........ G06F 8/70; G06F 9/4433; G06F 9/4436; G05B 19/41885
USPC ...................................................... 717/110
See application file for complete search history.

(56) References Cited

U.S. PATENT DOCUMENTS

| | | | | |
|---|---|---|---|---|
| 7,742,903 B2 * | 6/2010 | Ciolfi | .................. | G06F 17/5009 703/6 |
| 8,701,079 B2 * | 4/2014 | Niere | .................. | G05B 19/0426 717/104 |
| 9,250,873 B2 * | 2/2016 | Fischer | .............. | G05B 19/0426 |
| 2008/0091279 A1 * | 4/2008 | Biermann | .......... | G05B 19/0426 700/17 |
| 2011/0138353 A1 * | 6/2011 | Niere | ................. | G05B 19/0426 717/104 |
| 2013/0090886 A1 * | 4/2013 | Pueschl | ................. | G05B 17/02 702/113 |

(Continued)

FOREIGN PATENT DOCUMENTS

| | | |
|---|---|---|
| DE | 10 2011 082 838 A1 | 3/2013 |
| EP | 2 759 964 A1 | 7/2014 |

OTHER PUBLICATIONS dSpace, TargetLink Advanced Practices Guide, dSPACE GmbH (2008).*

(Continued)

*Primary Examiner* — Lewis A Bullock, Jr.
*Assistant Examiner* — Theodore Hebert
(74) *Attorney, Agent, or Firm* — Muncy, Geissler, Olds & Lowe, P.C.

(57) ABSTRACT

A computer-implemented method for editing data object variants of at least one software tool is described and presented, whereby the data object variants have at least one common software/hardware attribute and in each case a configuration of the attribute. It is possible to react to changing configurations of hardware attributes of different data object variants and thereby to changing matching groups during the editing of a data object variant in that for at least one attribute matching configurations of the attribute in different data object variants are captured and that for the attribute information on matching groups of data object variants is stored with the matching configurations of the attribute.

16 Claims, 8 Drawing Sheets

(56) References Cited

U.S. PATENT DOCUMENTS

2013/0218527 A1* 8/2013 Callahan .................. G06F 17/50
                                                    703/1
2014/0214783 A1* 7/2014 Stichling ................ G06Q 10/06
                                                    707/695
2014/0278307 A1   9/2014 Hosey et al.

OTHER PUBLICATIONS

Dr. Marcus Kees, "Compositional Variant Management and its Application in Embedded Software Development," ProStep iViP Symp., pp. 1-27 (Apr. 29, 2010).

* cited by examiner

Fig. 1

| V1 | |
|---|---|
| A | a1 |
| B | b1 |
| C | c1 |
| D | d1 |

| V2 | |
|---|---|
| A | a2 |
| B | b2 |
| C | c2 |
| D | d2 |

| V3 | |
|---|---|
| A | a3 |
| B | b3 |
| C | c3 |
| D | d3 |

$$a1 \stackrel{!}{=} a2 \stackrel{!}{=} a3$$
$$b1 \stackrel{!}{=} b2 \stackrel{!}{=} b3$$
$$c1 \stackrel{!}{=} c2$$

| | G1 | G2 | G3 |
|---|---|---|---|
| A | V1, V2, V3 | | |
| B | V1, V2, V3 | | |
| C | V1, V2 | V3 | |
| D | V1 | V2 | V3 |

Fig. 2

|   | V1  |
|---|-----|
| A | a1  |
| B | b1  |
| C | c1  |
| D | d1  |

|   | V2  |
|---|-----|
| A | a2  |
| B | b2  |
| C | c2  |
| D | d2  |

|   | V3  |
|---|-----|
| A | a3  |
| B | b3  |
| C | c3  |
| D | d3  |

$$a1 \stackrel{!}{=} a2 \stackrel{!}{=} a3$$
$$b1 \stackrel{!}{=} b2 \stackrel{!}{=} b3$$
$$c1 \stackrel{!}{=} c2$$

|   | G1 | G2 | G3 |
|---|----|----|----|
| A | a1: V1, V2, V3 |   |   |
| B | b1: V1, V2, V3 |   |   |
| C | c1: V1, V2 | c3: V3 |   |
| D | d1: V1 | d2: V2 | d3: V3 |

Fig. 3

|   | V1 |
|---|---|
| A | a̶1̶ a1' |
| B | b1 |
| C | c1 |
| D | d1 |

|   | V2 |
|---|---|
| A | a2 |
| B | b2 |
| C | c2 |
| D | d2 |

|   | V3 |
|---|---|
| A | a3 |
| B | b3 |
| C | c3 |
| D | d3 |

$$a1 \stackrel{!}{=} a2 \stackrel{!}{=} a3$$
$$b1 \stackrel{!}{=} b2 \stackrel{!}{=} b3$$
$$c1 \stackrel{!}{=} c2$$

|   | G1 | G2 | G3 |
|---|---|---|---|
| A | V1 | V2, V3 | |
| B | V1, V2, V3 | | |
| C | V1, V2 | V3 | |
| D | V1 | V2 | V3 |

Fig. 4

|   |    |
|---|----|
| A | a1 |
| B | b1 |
| C | c1 |
| D | d1 |

V1

|   |    |
|---|----|
| A | a2 |
| B | b2 |
| C | c2 |
| D | d2 |

V2

|   |    |
|---|----|
| A | a3 |
| B | b3 |
| C | c3 |
| D | d3 |

V3

$$a1 \stackrel{!}{=} a2 \stackrel{!}{=} a3$$
$$b1 \stackrel{!}{=} b2 \stackrel{!}{=} b3$$
$$c1 \stackrel{!}{=} c2$$

|   | G1 | G2 | G3 |
|---|----|----|----|
| A | L(V1), L(V2), L(V3) |  |  |
| B | L(V1), L(V2), L(V3) |  |  |
| C | L(V1), L(V2) | L(V3) |  |
| D | L(V1) | L(V2) | L(V3) |

| | V1 |
|---|---|
| A | a1 |
| B | b1 |
| C | c1 |
| D | d1 |

| | V2 |
|---|---|
| A | a2 |
| B | b2 |
| C | c2 |
| D | d2 |

| | V3 |
|---|---|
| A | a3 |
| B | b3 |
| C | c3 |
| D | d3 |

$$a1 \overset{!}{=} a2 \overset{!}{=} a3$$
$$b1 \overset{!}{=} b2 \overset{!}{=} b3$$
$$c1 \overset{!}{=} c2$$

| | G1 | G2 | G3 |
|---|---|---|---|
| A | a1: V1, V2, V3 | | |
| B | b1: V1, V2, V3 | | |
| C | c1: V1, V2 | c3: V3 | |
| D | d1: V1 | d2: V2 | d3: V3 |

| | G1 | G2 | G3 |
|---|---|---|---|
| A | a1: V1, V2, V3 | | |
| B | b1: V1, V2, V3 | | |
| C | c1: V1, V2, V3 | | |
| D | d1: V1 | d2: V2 | d3: V3 |

Fig. 8

COMPUTER-IMPLEMENTED METHOD FOR EDITING DATA OBJECT VARIANTS

BACKGROUND OF THE INVENTION

Field of the Invention

The present invention relates to a computer-implemented method for editing data object variants of at least one software tool, whereby the data object variants have at least one common element and in each case a configuration of the elements. In this regard, the invention also relates to a computer hardware development platform for editing data object variants of at least one embedded software component.

Description of the Background Art

Methods for editing data object variants are known from different technical development fields, primarily from such fields in which the involved developers in fact have to solve similar, but in parts nevertheless varying engineering tasks in terms of programming. This occurs typically when different product variants are the goal of the development, which means products that apart from common, identical parts also have parts that differ from one another.

A field of technical tasks in which a plurality of data object variants must often be edited, is electronic control unit (ECU) development that has become an important part in the development of production vehicles, for example. Today, control devices are generally understood to be robust microcomputers prepared for industrial use with usually integrated I/O interfaces. Programs, which in the broadest sense communicate via the I/O interface with a technical process to be controlled and act upon this process in a desired manner, are executed in the control devices often equipped with a real-time operating system.

If, for example, control devices are being developed for gasoline engines of a new vehicle series, then it is immediately obvious that control devices for engine variants have on the one hand some functionalities which are implemented by programming and can be and also are identical in the different control devices, and on the other hand, certain functionalities must be implemented differing from one another in order to satisfy the different circumstances of the individual engine variants.

If the different variants of the programming-implemented engine control functionality are to be understood as data object variants, then subfunctionalities can be understood as attributes of these data object variants, for example, the functionality for controlling injection time and injection pressure, the functionality for controlling exhaust gas flow, etc.; similarly, individual parameters or parameter sets for parameterization of controls, sensors, etc., can be regarded as attributes. The specific configurations of the aforementioned functionalities and the assignments of specific values to parameter sets and parameters are then the particular configurations of the associated attributes.

During the editing of data object variants, for reasons of work efficiency and clarity, there is great interest in identifying attributes that may have a matching configuration, because these attributes of the different data object variants need to be developed, stored by information technology, and tested only once, which simplifies the development activities overall. Thus, each data object functionality and subfunctionality or attribute is stored in memory for retrieval and use by the development platform.

At the initial development activities, a task in the prior art therefore is to identify arising data object variants and also to foresee the common attributes of the data object variants that will have a matching configuration or configurations differing from one another. As a general rule, therefore, before work is begun on editing the different data object variants and establishing the specific configuration, it must be determined whether and to what extent certain data object variants match certain configurations of common attributes. The thus predefined matching groups between different data object variants are then specifically configured, with each data object variant then resulting from the merging of predetermined matching groups. It can be readily seen that this approach requires a considerable amount of foresight and experience, because it is only possible to react to a change in matching groups during development with great difficulty.

SUMMARY OF THE INVENTION

It is therefore an object of the present invention to provide a computer-implemented method and a computer hardware development platform for editing data object variants of a software tool, with which it is possible to react to changing matches between configurations of attributes, for example hardware or software attributes, of different data object variants, and thereby to changing matching groups, during the editing of data object variants as well.

The previously indicated and established object in the computer-implemented method for editing data object variants of a software tool described above is achieved by capturing for at least one matching configuration of the attributes in different data object variants and by storing the attribute information on matching groups of data object variants, therefore information on the data object variants with the matching configurations forming a matching group.

The method of the invention therefore also assures that during the editing of data object variants it is automatically checked whether there are matches between different configurations of an attribute in different data object variants for which matching configurations were found, the data object variants with matching configurations are combined into matching groups and the relevant information is stored. As a result, this automatically provides an overview as to which data object variants match in which "identical portions" and consequently also which data object variants differ in which configurations of hardware.

According to an embodiment of the above-described method, it is provided that the matching configurations of the particular attribute in the data object variants are captured for all attributes and information on matching groups of data object variants is stored for each attribute, whereby matching groups, as before, are formed by the data object variants that have the matching configurations of the particular attribute. The extension of the search for and capturing of matching configurations to the configurations of each attribute of the data object variants has the advantage that no new arising matching groups can be missed or unraveling matching groups are always recognized.

According to an embodiment of the above described device, the data object variants correspond to firmware circuitry adapted for the particular attributes. This allows for easy adaptability to a variety of hardware/software peripherals each of which may or may not be present, thus ensuring that power, circuit area, inputs/outputs and processing can be efficiently allocated among the connected hardware/software peripherals. For example, an electronic control unit would be able to more efficiently balance power if it was manufactured with the precise attributes corresponding to the hardware/software peripherals to be connected to it.

A further improvement of the computer-implemented method is achieved in that in each editing process of a data object variant, at least with respect to the edited attribute, it is again checked whether a change in the matching groups will result. In the case of a change in a configuration of this attribute, current information on matching groups of those data object variants is stored with the matching configurations of the attribute. In this embodiment of the method, a constant and uninterrupted check of the data object variants occurs with respect to the present and resulting matching groups of data object variants. The thus achieved classification of an attribute in matching groups of data object variants is therefore always up-to-date and completely observable.

The information, stored for the particular attribute, on matching groups may be configured completely differently. The information, stored for the attribute, on matching groups according to one embodiment of the method is stored simply as a list of identifiers of the data object variants with matching configurations of the attribute. In a further embodiment of the method, it is provided that the information, stored for the attribute, on matching groups have a link to the covered data object variants, so that the common configuration of the attribute can be seen in the linked data object variant itself. Conversely, in a further embodiment of the method, it is provided that the data object variants comprise a link to the attribute with the stored information on matching groups, which have the common configurations of the attribute. In each case, it can be readily determined which matching groups exist, what they consist of, and which specific configurations of the attribute they affect. In an especially clear embodiment of the computer-implemented method, it is provided that the information, stored for the attribute, on matching groups has the matching configurations of the attribute itself, so that all data on the matching groups are therefore stored in a central location, namely, the attribute gathered together in the matching groups and also the matching configurations of these attributes.

In an embodiment of the method, an additional data object variant, i.e., one that goes beyond the thus far existing data object variants, is created in that an existing data object variant is selected as a starting point and the existing information on matching groups of data object variants is automatically supplemented with information on the additional data object variant. This is realized especially so that the matching groups that comprise the existing data object variant serving as a starting point, are supplemented with information such that said matching groups also comprise the additional, created data object variant. As a result, this means that the added data object variant bases itself initially completely on the data object variant serving as the starting point, and deviations from the data object variant serving as the starting point are then established afterwards.

The editing of an existing data object variant is preferably realized in that the data object variant is first designated or selected, the matching groups comprising the data object variant to be edited are then determined automatically, and the configurations of attributes that belong to the data object variant to be edited are released for editing. This assures that in fact all configurations of attributes belonging to the data object variant can be edited, but simultaneously it is also assured, however, that a more extensive change in the configurations of hardware attributes is not possible. Naturally, several variants can be edited simultaneously, if these are named at the start of the editing; the aforementioned release of configurations of attributes then occurs for all affected data object variants.

The invention relates further to a computer program product with a computer program having software for carrying out the method described above, when the computer program is executed by a computer.

Moreover, the previously established object in the aforementioned computer hardware development platform is achieved in that configurations of this attribute, matching in at least one attribute, are captured in different data object variants and that for the attribute information on matching groups of data object variants is stored with the matching configurations of the attribute. Of course, the computer hardware development platform is designed to allow for the previously explained computer-implemented method for editing data object variants to be executed very specifically with it.

In an embodiment, the work environment is implemented within the software tool; in a further embodiment, the work environment is implemented independent of the software tool, however, whereby preferably the work environment can also access data object variants of a number of software tools. This is particularly important when data from different software tools that nevertheless may refer to the same product or to the same development device, are managed on the development platform. In the example of control device development, the different software tools, for example, may be a mathematical modeling and simulation environment, code generators, various compilers, or, for example, test environments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
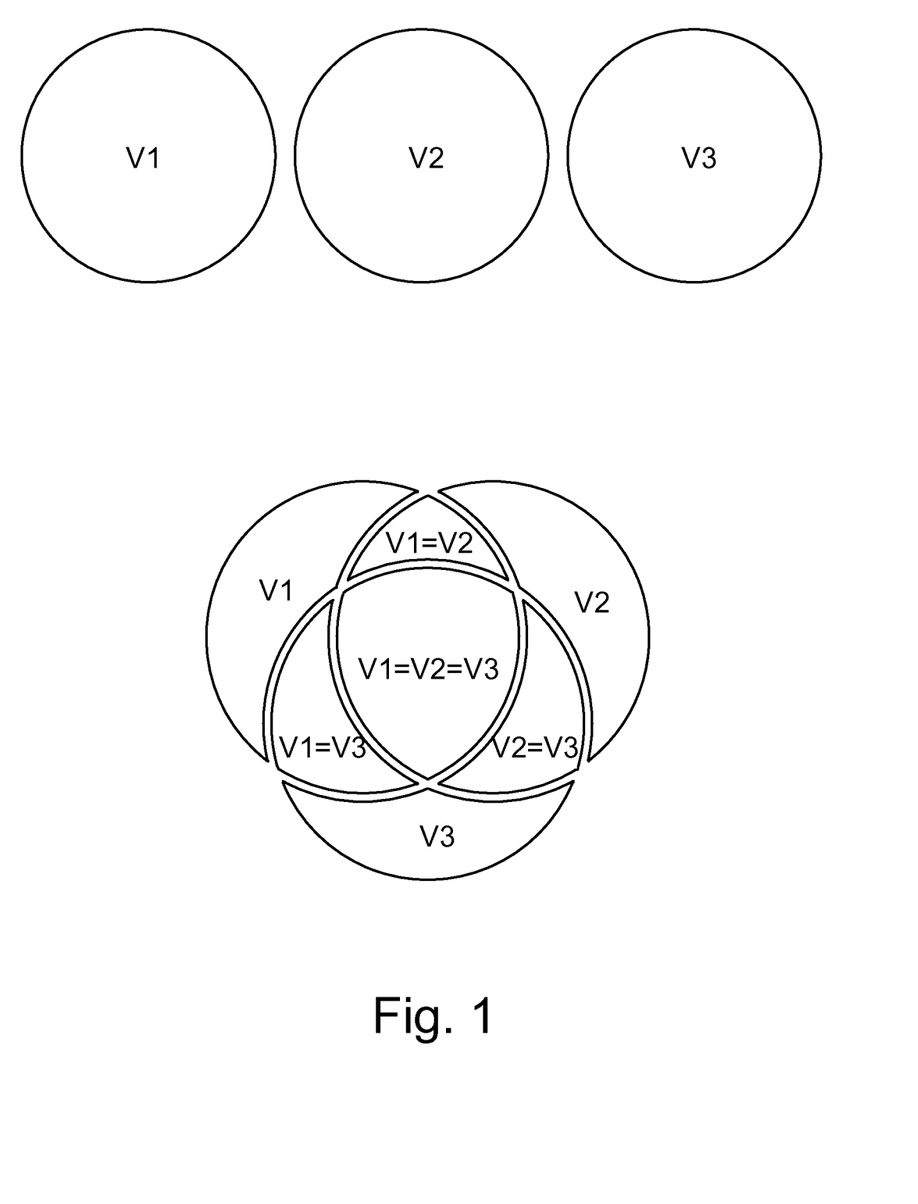
FIG. 1 shows a schematic illustration to explain data object variants and matching groups.

FIG. 1 shows a total of three data object variants V1, V2, and V3. Each of the data object variants V1, V2, and V3 contains certain attributes and specific configurations of these attributes, which are not depicted here in detail, however. The attributes contained in data object variants V1, V2, and V3 can be unique in their configuration for a data object variant V1, V2, or V3, but it is also possible that the data object variants V1, V2, and V3 have common configurations of an attribute or a number of attributes.

In FIG. 1, at the bottom, the theoretically generally only possible matching between the three assumed data object variants V1, V2, V3 are depicted, as is made clear by the labeled intersections. The data object variants V1, V2, and V3 may generally have no matches in attributes or in the configurations of attributes, which is made clear by the outer segments V1, V2, and V3. The data object variants V1 and V2 can match in configurations of a common attribute , which the segment V1=V2 makes clear; this also applies to data object variants V1 and V3, as well as data object variants V2 and V3 (V1=V3 and V2=V3). Finally, all data object variants V1, V2, and V3 as well can match in configurations of an attribute or a number of attributes; see segment V1=V2=V3.

The data object variants V1, V2, and V3 therefore have the matching groups V1=V2, V2=V3, V1=V3, and V1=V2=V3 and the "remainder" matching groups V1, V2, and V3, whereby these naturally do not cover all attributes but only the attributes not included in the other matching groups.

An approach practiced in the prior art in the editing of data object variants consists of anticipating and establishing the matching groups at the beginning of the project work, whereby the data object variants (full circles in FIG. 1) V1, V2, and V3 are then made up from the different matching groups: The data object variant V1 then arises, for example, from the matching groups V1=V2, V1=V3, V1=V2=V3 and the segment V1 without the attributes of the matching groups in which the data object variant V1 participates.

A computer-implemented method for editing data object variants of at least one software tool and schematically a computer-aided work environment for editing data object variants of at least one software tool that allow for the editing of data object variants, leading to in a change in the matching groups, are shown in FIGS. 2 to 8, whereby however the changing matching groups are automatically captured and tracked. A breakdown of the data object variants into matching groups, said breakdown being established at the beginning of the editing of data object variants, is therefore not necessary. Advantageously, the corresponding hardware can be emulated and edited with software in this manner.

Figure 2:
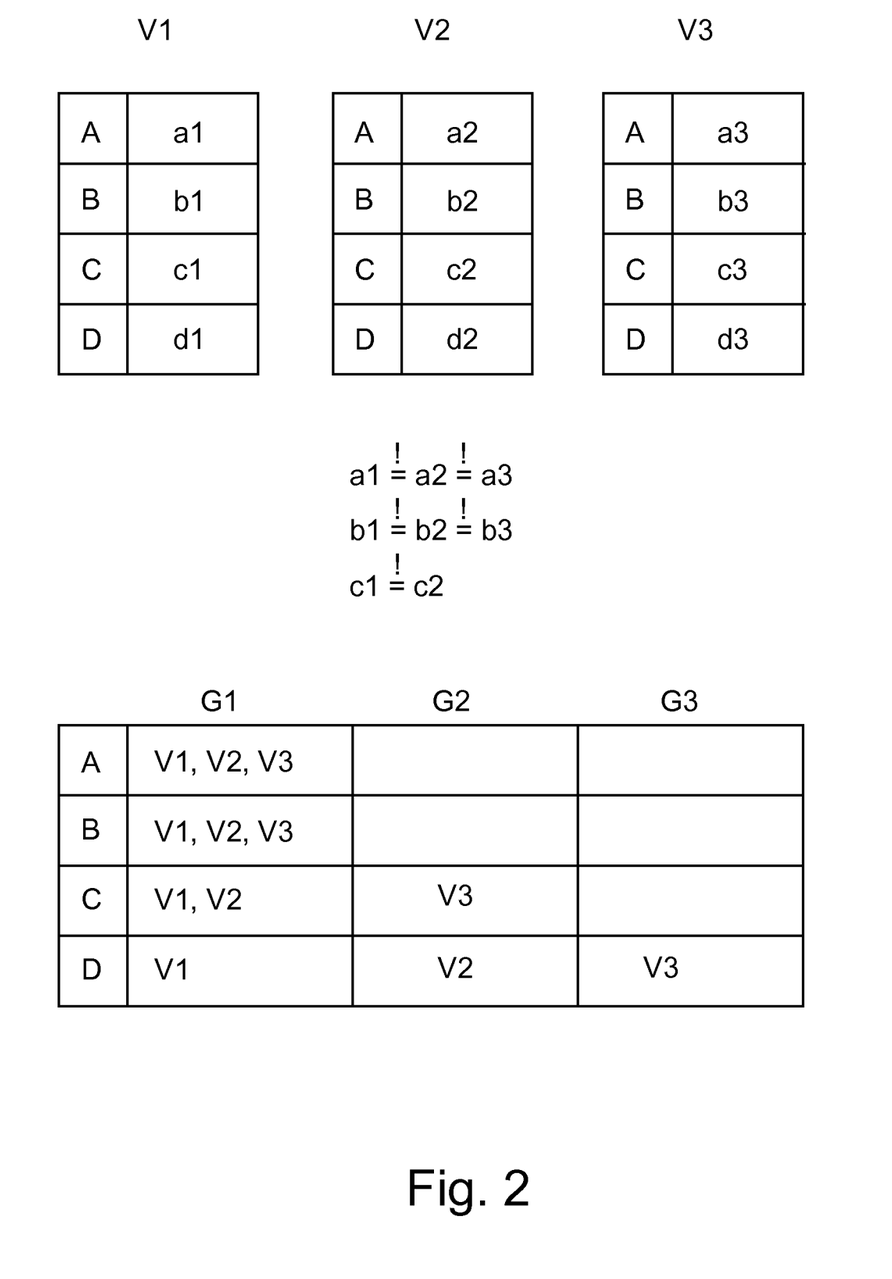
FIG. 2 shows a computer-implemented method of the invention for editing data object variants with information on matching groups.

The data object variants V1, V2, and V3, with the common attributes A, B, C, and D, are shown in the top part of FIG. 2. Each of the data object variants V1, V2, and V3 can have special configurations a, b, c, d of attributes A, B, C, D. The configurations of attributes A, B, C, D are labeled as a1, b1, c1, and d1 for the data object variant V1, as a2, b2, c2, and d2 for the data object variant V2, and as a3, b3, c3, and d3 for the data object variant V3. Further, it was established for the data object variants V1, V2, and V3 that they match completely in the configurations for attributes A and B; it therefore applies that a1 is identical to a2 which is identical to a3, and that b1 is identical to b2 which is identical to b3. It is established, moreover, that the data object variants V1 and V2 match with respect to attribute C, so that therefore c1 is identical to c2. Accordingly, there is no match with respect to the remaining configurations of the attributes.

Typically, the attributes A, B, C, and D within the context of control device development are mathematical models, submodels, functions in symbolic or textual high-level language, hardware descriptions, test scripts, parameter sets, or also individual parameters, for example.

In a hardware environment, the attributes A, B, C, D correspond to sensor inputs/outputs, power levels, read-in clock rates, signal maximum and minimum voltages, and device or processing priority, for example. Some of these attributes could be grouped together, for instance, more than one port may have the same clock rate, or more than one device may be powered at the same voltage, or more than one sensor inputs/outputs may be repeated.

It is provided in the method presented here and the development platform presented here that for at least one attribute A, B, C, D matching configurations a, b, c, d of said attribute in different data object variants V1, V2, and V3 are captured and that for the particular attribute A, B, C, D information on matching groups G1, G2, G3 of data object variants V1, V2, V3 is stored. Therefore the matching groups G1, G2, and G3—in whatever specific informational presentation—each time contain the compilation of the data object variants that have matching configurations a, b, c, d with respect to the attribute A, B, C, or D to which they are related. If the matter concerns the matching groups G1, G2, and G3 in regard to the examples, shown in the figures, then this is a simplifying notation, because matching groups always exist with respect to a hardware attribute. The matching group G1, e.g., in the shown examples strictly speaking comprises potentially the attribute-based matching groups G1(A), G1(B), G1(C), and G1(D).

In the exemplary embodiment according to FIG. 2, the information consists only of a list of the data object variants V1, V2, V3 in which the configurations a, b, c, d of the particular attribute A, B, C, and D match. The matching group G1 with respect to attribute A, therefore G1(A), accordingly comprises as information on the matching group the naming of the data object variants V1, V2, and V3. The matching group G2 for attribute C, therefore G2(C), comprises only the data object variant V3, whereas matching group G1 with respect to attribute C, therefore G1(C), names the data object variants V1 and V2 as information on the matching group G1(C). It is therefore evident at any time from the stored information on the matching groups G1, G2, and G3 how the data object variants V1, V2, and V3 are segmented with respect to their attributes.

Figure 3:
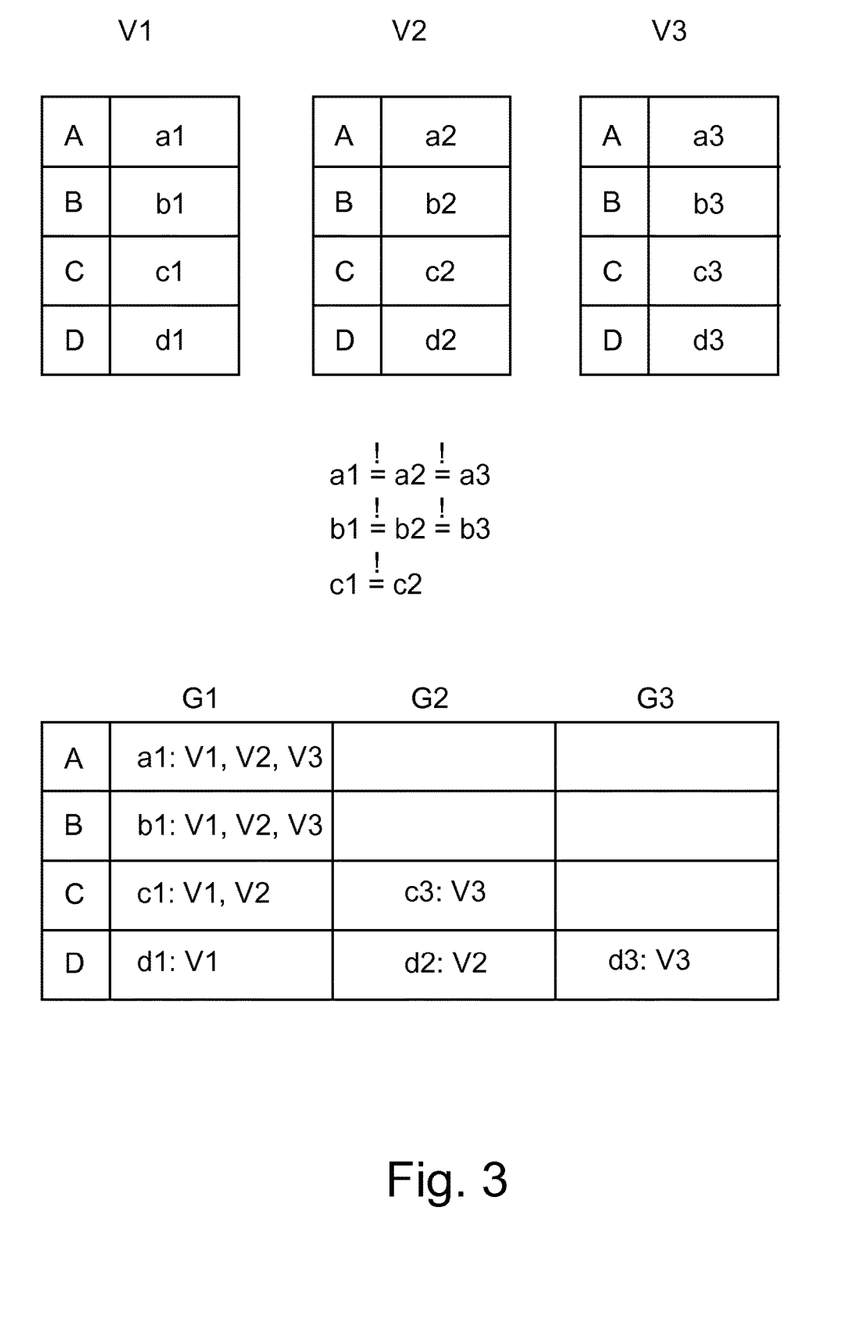
FIG. 3 shows the method according to FIG. 2 with the configurations of hardware attributes, which are stored together with the matching groups on the affected attributes.

An embodiment of the method and the development platform is shown in FIG. 3, whereby in this embodiment the information, stored for the attribute A, B, C, D, on the matching groups G1, G2, and G3 has the matching configurations a, b, c, d of the attribute A, B, C, D. For example, the configuration c3 for the data object variant V3 is stored in the matching group G2 for attribute C. The exemplary embodiment makes clear, like the exemplary embodiment according to FIG. 2, that a matching group G1, G2, G3 can also consist only of information on a single data object variant V1, V2, V3.

Figure 4:
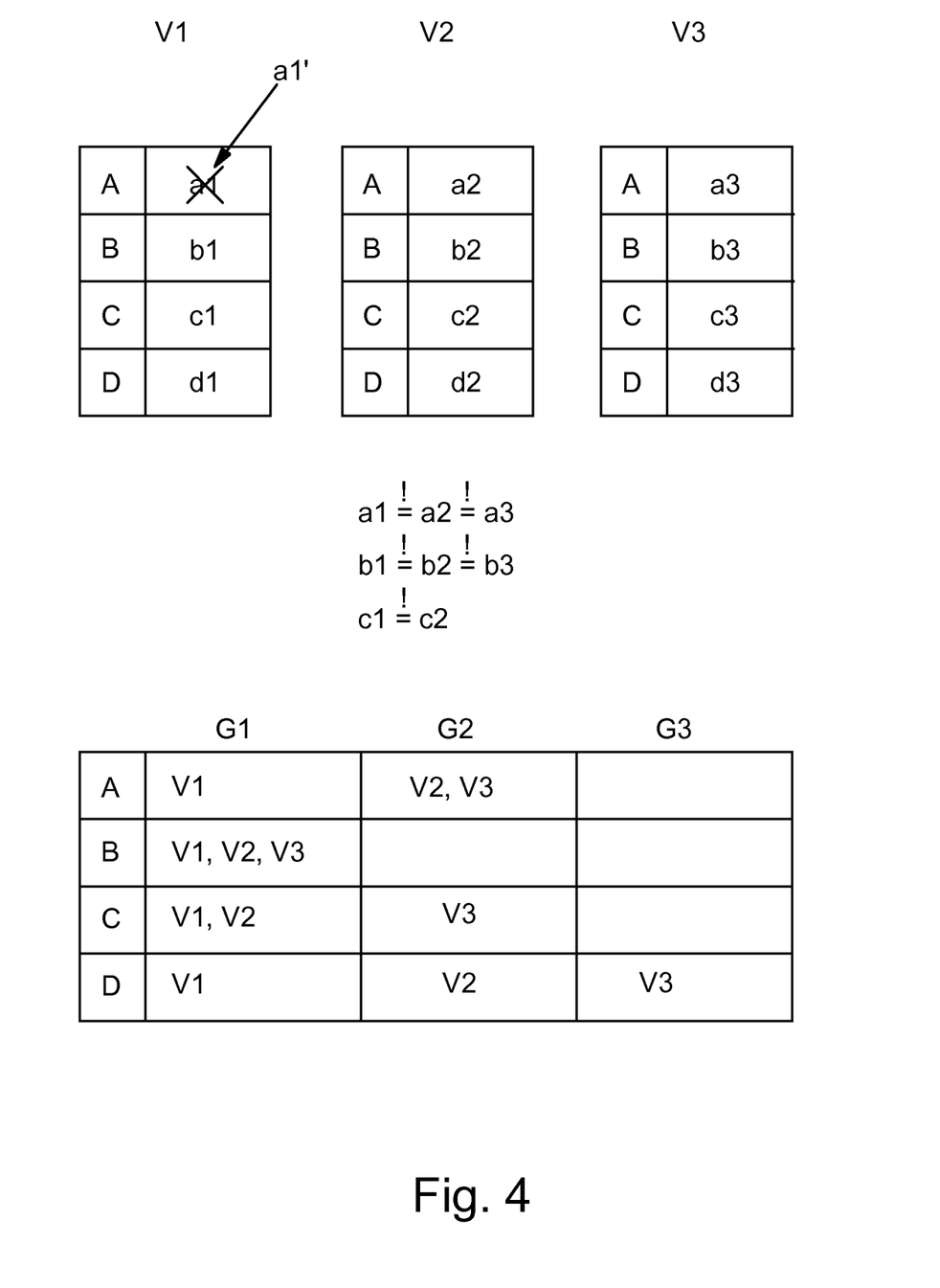
FIG. 4 shows the behavior of the method according to FIGS. 2 and 3 when the configuration of a hardware attribute in a data object variant is changed.

The editing of the existing data object variant V1 is shown in FIG. 4, as well as the result of using the method in regard to the adjustment of the matching groups G1 and G2. In FIG. 4, proceeding from data object variants V1, V2, and V3, already shown in FIGS. 2 and 3, the configuration a1 of attribute A in data object variant V1 is changed, namely, a1 to a1'. The method now provides that after this editing process the data object variant V1 is again checked at least with respect to the edited attribute A as to whether there is a resulting change in the matching groups G1 and G2. In the case of a change to this attribute A, current and updated information on the matching groups G1 and G2 of the data object variants with the matching configurations of attribute A is saved. In the present case, the change in the configuration a1 to configuration a1' of attribute A in the data object variant V1 has the result that a new matching group G2(A) for the attribute A arises, whereas attribute group G1(A) with respect to attribute A is reduced in terms of content, namely, to the sole information on data object variant V1. The matching group G2(A), in contrast, contains information on data object variants V2 and V3, because according to the precondition these have identical configurations a2 and a3. In this embodiment of the method, during the editing of data object variants V1, V2, V3, current information on the matching groups G1, G2, and G3 is received constantly; i.e., the boundary between the matching groups G1, G2 and G3 can change perfectly freely during the editing of the data object variants; new matching groups can arise freely just as existing matching groups can be dropped. The problem of the data object variants to be specified initially, therefore, before the actual editing of data object variants, and the matching groups is solved here.

Figure 5:
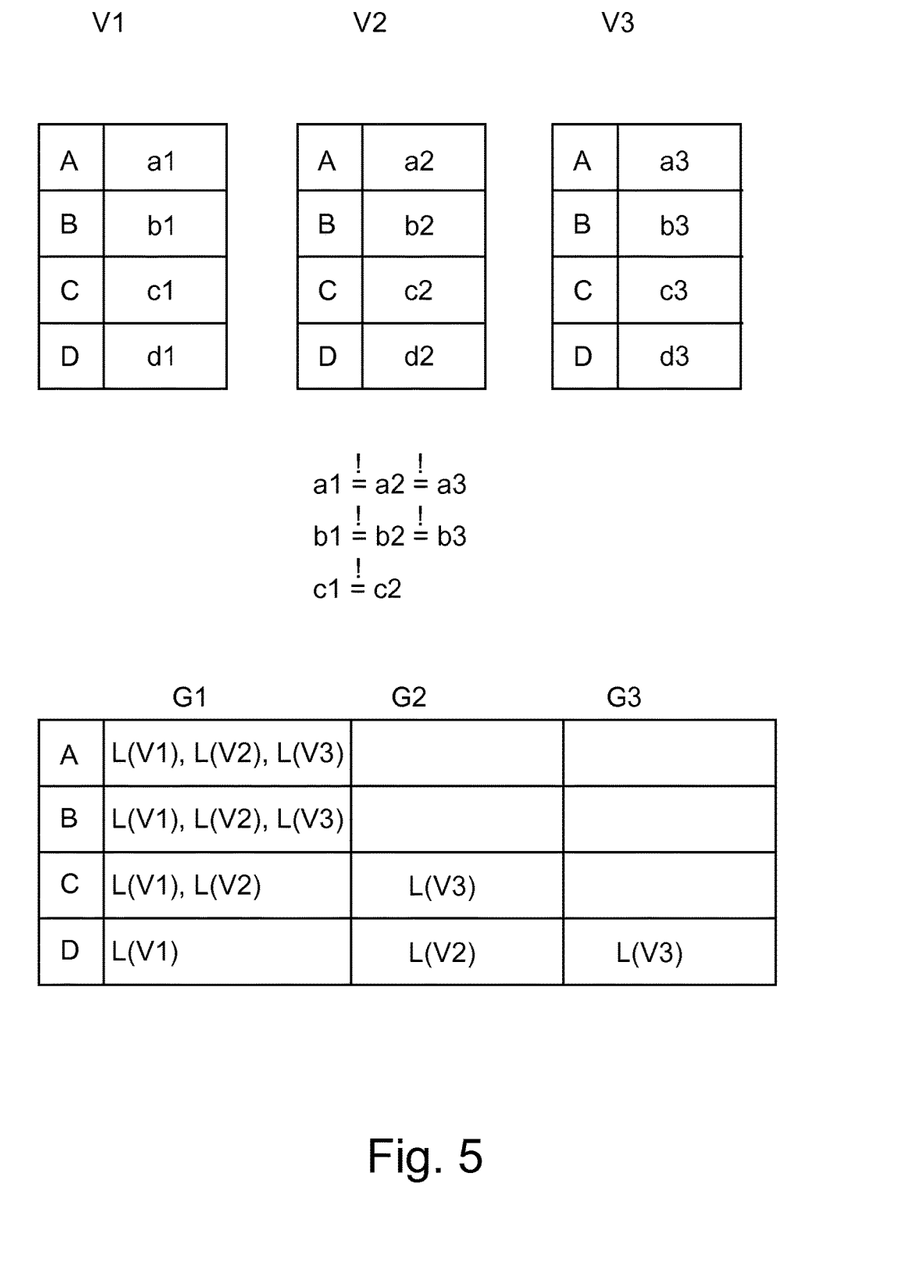
FIG. 5 shows the computer-implemented method according to FIGS. 2 to 4 with links to the data object variants in the matching groups.

In the computer-implemented method, shown in FIG. 5, the information in the matching groups G1, G2, G3 no longer consists of a list of identifiers of the data object variants V1, V2, V3, but the information in each case comprises a link L to the data object variants V1, V2, V3, so that via the links L(V1), L(V2), and L(V3) one can jump from each matching group G directly to the affected data object variants V1, V2, V3.

Figure 6:
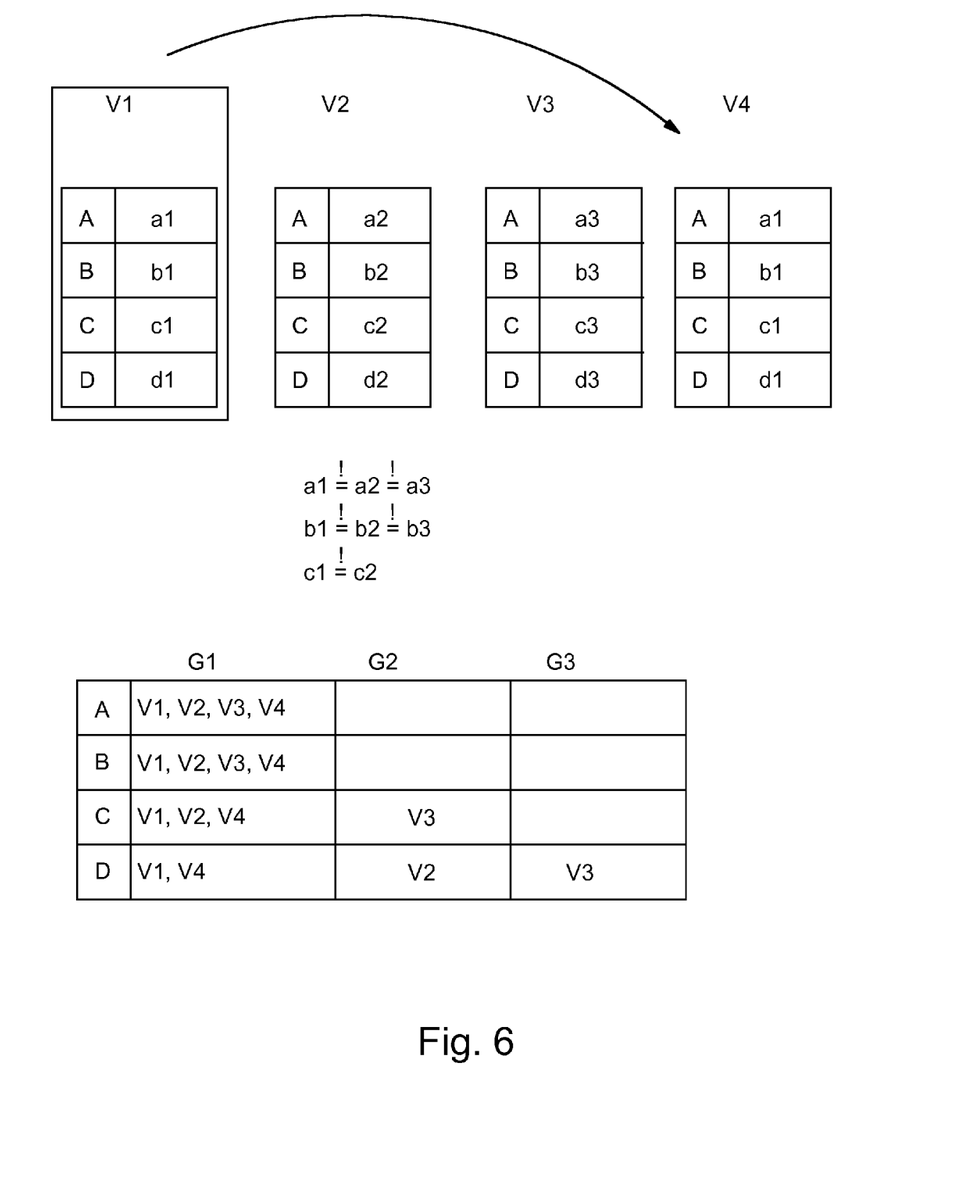
FIG. 6 shows the computer-implemented method according to FIGS. 2 to 5 to explain the creation of a new data object variant.

It is illustrated in FIG. 6 how an additional, new data object variant V4 is added to the existing data object variants V1, V2, V3. The creation of the additional data object variant V4 occurs in that an existing data object variant, here data object variant V1, is selected as the starting point and the existing information, shown at the bottom in FIG. 6, on the matching groups G1, G2, G3 of the data object variants, therefore the existing data object variants V1, V2, V3, is supplemented with information on the additional data object variant V4. This occurs in that the matching groups, here therefore all matching groups under G1, therefore G1(A), G1(B), G1(C), and G1(D) comprising the existing data object variant V1 used as the starting point, are supplemented with information so that these matching groups G1 also comprise the additional, created data object variant V4. In the shown example, the matching groups under G1 have been supplemented with the identifier V4 of the additional data object variant V4. The existing data object variant most similar to the future data object variant to be created, i.e., with the most matching attributes, is preferably used in general as the starting point for creating a new data object variant.

Figure 7:
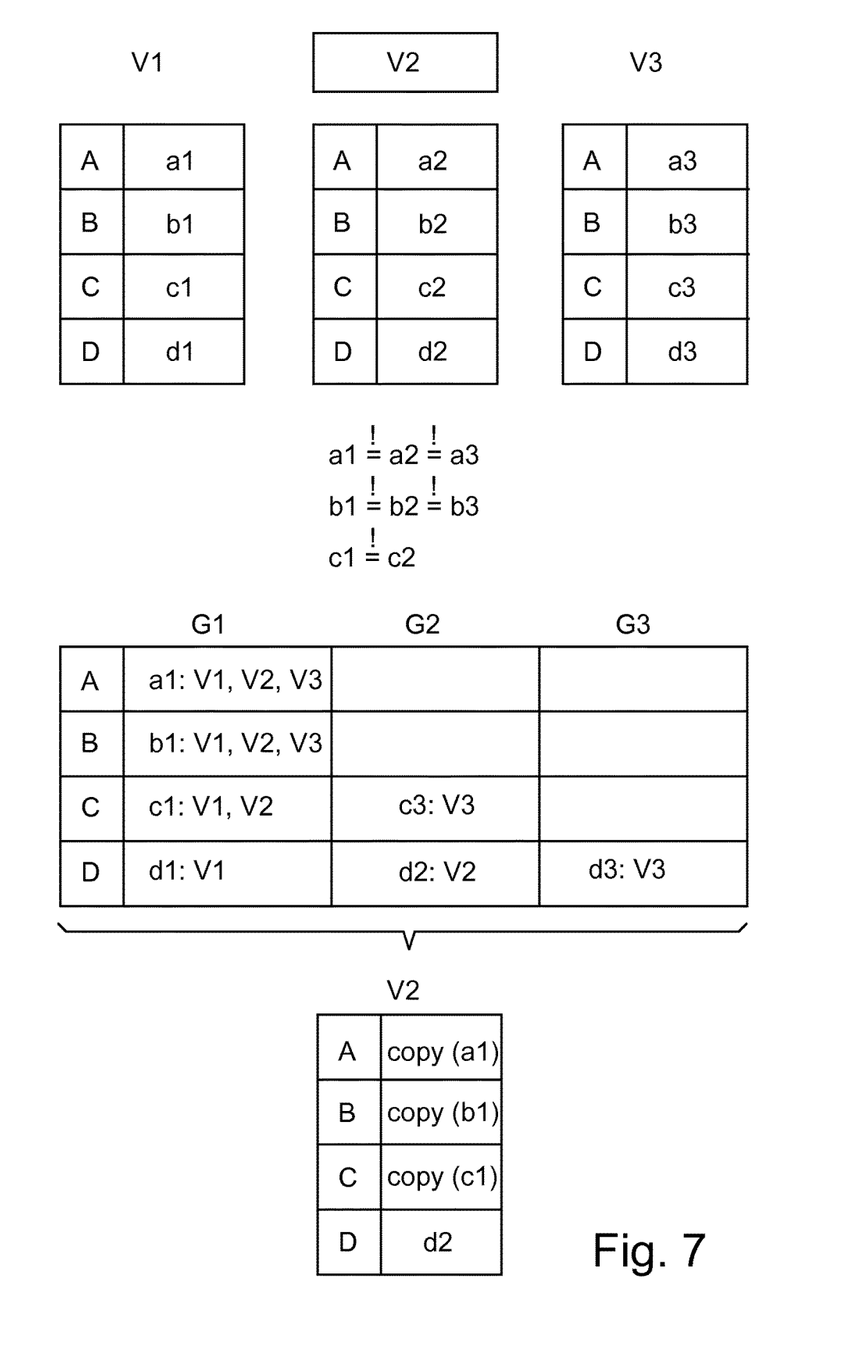
FIG. 7 shows the computer-implemented method according to FIGS. 2 to 6 to explain the editing of an existing data object variant.

The editing of the existing data object variant V2 is shown in FIG. 7. For editing, the data object variant V2 is first designated, which is symbolized in FIG. 2 by the border around identifier "V2." Then the matching groups are determined that comprise the data object variant to be edited, which in the present case are the matching groups G1(A), G1(B), G1(C), and G2(D). Subsequently, the configurations of attributes A, B, C, D belonging to data object variant V2 to be edited, are then released for editing; in the shown case, these are the configurations a1, b1, c1, and d2.

During the editing of configurations a, b, c, d of attributes A, B, C, D of a data object variant V, it can occur that due to the editing and changing of a configuration a, b, c, d additional matching groups G arise, because the change in a configuration a, b, c, d leads to an elimination of a previously existing match. To prevent the loss of specific configurations a, b, c, d during editing, it is provided further that the editing of the configuration a, b, c, d of an attribute A, B, C, D in the context of data object variant V2 to be edited occurs by using a copy of said configuration a, b, c, d of attribute A, B, C, D. Generally restated, it is provided that for at least one of the attributes A, B, C, D the editing of configurations a, b, c, d occurs with using a copy. For example, copies of all configurations a, b, c, d for editing can be created, which are assigned to more than one data object variant V. Work with the previously described copies is completely reasonable in general; it is reasonable in particular if the matching group G associated with this attribute A, B, C, D comprises more than the data object variant V2 to be edited. In the exemplary embodiment according to FIG. 7, copies of the configurations a1, b1, c1 are prepared for this reason, which are designated as copy(a1), copy(b1), and copy(c1). Because configuration d2 in the matching group G2(D) does not contain a number of data object variants, it is not necessary to work with a copy of configuration d2.

Figure 8:
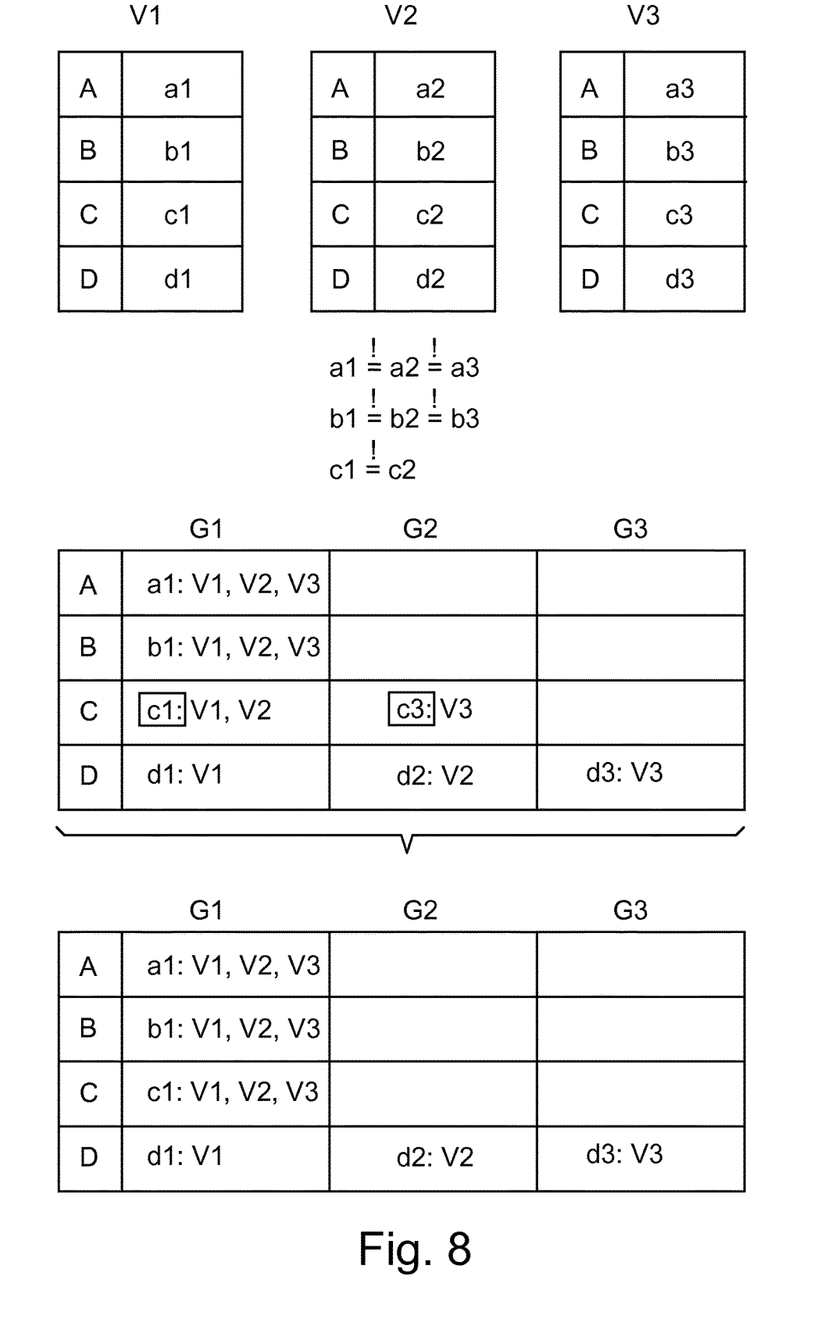
FIG. 8 shows the computer-implemented method according to FIGS. 2 to 7 to explain the - partial - mapping of a data object variant to another data object variant.

FIG. 8 illustrates the approach of the computer-implemented method and the hardware development platform in case the configuration a, b, c, d of an attribute A, B, C, D of a first data object variant is applied to an additional data object variant. In the shown example, configuration c1 of the data object variant V1 is to be applied to data object variant V3. This occurs by selecting the to-be-applied configuration c1 of attribute C of first data object variant V1 (identified by the box around configuration c1) and by selecting the additional data object variant (in the exemplary embodiment this occurs indirectly by the border around configuration c3 of data object variant V3). Thereupon, in regard to attribute C of the affected configuration c1, the matching group G1(C), which comprises the first data object variant V1, is supplemented by the additional data object variant V3. It can be seen in the bottom table in FIG. 8 that data object variant V3 is now named in addition in matching group G1(C). This additional data object variant V3 is deleted from matching group G2(C) of attribute C of affected configuration c3 comprising the additional data object variant V3, so that data object variant G2(C) is removed. As a result, use of the method allows for a current picture of the matching groups to be again automatically obtained, also after the application of configurations of attributes.

In one exemplary embodiment, the above described method and development platform are applied to electronic control units (ECU) which can be used with a variety of peripherals and special use cases, e.g. engine control unit, traction control unit, power control unit or battery control unit. Each unit has similar processing capabilities but very different hardware connected to it. Therefore, it would be advantageous to be able to easily adapt not only each ECU to its specific function and peripherals but also adapt each ECU to every different hardware attribute.

Providing a testing and development platform for this capability is difficult because the hardware peripherals can be shared between ECUs (e.g. both engine and battery control may need engine RPM data) and the hardware attributes can be shared between hardware peripherals (e.g. multiple devices operating at the same voltage or the same clock rate). With the disclosed development platform, peripheral hardware groups and their associated, but not entirely overlapping, attribute variants can be easily selected and integrated into a circuit.

In another exemplary embodiment, the integrated circuit is specially adapted to a variant where each of its inputs and outputs corresponds to an identified peripheral hardware device and the look up tables, limits and controls on board only apply to that group of peripherals as a whole. In this case, a car manufactured with base model hardware plus added window/mirror heating would be controlled by several ECUs all of which account for the added power demands of the window/mirror heating.

Therefore, this application not only discloses an efficient method for ECU hardware manufacture and development but also an ECU with limits, controls, input/outputs and processing efficiently adapted to the use case. Structurally this translates into minimal input/output pins, reduced memory allocated to look-up tables, minimal data overhead in device to device communication and completely integrated, hardware ECUs in some cases.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for editing and testing data object variants of electronic control units of at least one software tool executing on a computer hardware platform, the data object variants having at least two hardware attributes, at least one common hardware attribute, and a configuration of the common hardware attribute, the method comprising:
capturing, for the at least one common hardware attribute, matching configurations of the at least one common hardware attribute across the data object variants;
storing in a memory, for the at least one common hardware attribute, information on matching groups of the data object variants with the matching configurations of the at least one common hardware attribute,
wherein the matching groups are lists of the data object variants, each matching group having at least one of the matching configurations,
wherein the information on matching groups includes the list corresponding to a particular matching group of the matching groups containing the at least one common hardware attribute, and
wherein the at least one common hardware attribute is included in the at least two hardware attributes;
editing a designated data object variant of the data object variants by editing of one of the at least two hardware attributes of the designated data object variant within the matching configurations;
after editing of the data object variant, updating the information on matching groups;
testing the data object variants by testing the at least one common hardware attribute for the matching groups of the data object variants; and
based on results of the testing, integrating the tested data object variants into electronic control unit integrated circuits.

2. The computer-implemented method according to claim 1, wherein the matching configurations of the common hardware attribute in the data object variants are captured for all the hardware attributes, and the information on matching groups of the data object variants with the matching configurations of the hardware attribute is stored for each hardware attribute.

3. The computer-implemented method according to claim 1, wherein after editing of a data object variant of the data object variants, the data object variant is checked at least with respect to an edited hardware attribute whether the editing results in a change in the matching groups, and wherein, in the case of a change in the edited hardware attribute, updated information on the matching groups of the data object variants is stored with the matching configurations of the edited hardware attribute.

4. The computer-implemented method according to claim 1, wherein the information, stored for the at least one common hardware attribute of the matching groups, comprises a list of identifiers of the data object variants which have the matching configurations of the at least one common hardware attribute.

5. The computer-implemented method according to claim 1, wherein the information stored for the at least one common hardware attribute of matching groups comprises a link to the data object variants that have the matching configurations of the at least one common hardware attribute, or wherein the data object variants comprise a link to the at least one common hardware attribute with the stored information being on matching groups that have the matching configurations of the at least one common hardware attribute.

6. The computer-implemented method according to claim 1, wherein the information stored for the at least one common hardware attribute on the matching groups has the matching configurations of the at least one common hardware attribute within the information.

7. The computer-implemented method according to claim 1, wherein an additional data object variant is created with an existing data object variant selected as the starting point, and the information on matching groups of the data object variants is supplemented with additional information on the additional data object variant.

8. The computer-implemented method according to claim 7, wherein the matching groups that comprise the existing data object variant serving as the starting point are supplemented with the additional information so that said matching groups also comprise the additional data object variant.

9. The computer-implemented method according to claim 1, wherein, before editing one of the data object variants, first one of the data object variants is designated, the matching groups comprising the designated data object variant are determined, and the configurations of hardware attributes that belong to the designated data object variant are released for editing.

10. The computer-implemented method according to claim 9, wherein the editing of a configuration of one particular hardware attribute of the at least two hardware attributes with respect to the designated data object variant is performed by copying the configuration of the particular hardware attribute hardware attribute.

11. The computer-implemented method according to claim 1, wherein a configuration of a particular hardware attribute of a first data object variant is applied to at least one additional data object variant such that the configuration of the hardware attribute of the first data object variant is selected, such that the additional data object variant is selected, and such that, with respect to the particular hardware attribute of the configuration, the information on matching groups that comprise the first data object variant are supplemented by the additional data object variant, and the additional data object variant is deleted from the information on matching groups of the particular hardware attribute of the configuration comprising the additional data object variant.

12. The computer-implemented method according to claim 1, wherein the at least two hardware attributes, the common hardware attribute, and the configuration of the at least one common hardware attribute are emulated in software.

13. A computer-aided work environment executing on a computer hardware platform for editing and testing a designated data object variant of at least two data object variants of electronic control units of at least one software tool, the data object variants having at least two hardware attributes, at least one common hardware attribute, and for each common hardware attribute a configuration of the common hardware attribute, wherein the computer-aided work environment performs the steps of:
  capturing for at least one common hardware attribute, matching configurations of the common hardware attribute in different data object variants;
  storing, in memory, information on matching groups of data object variants, wherein the information on matching groups of data object variants is connected with the matching configurations of the common hardware attribute and
  the matching groups are lists of the data object variants, each matching group having at least one of the matching configurations, and further
  the information on matching groups includes the list corresponding to a particular matching group of the matching groups containing the at least one common hardware attribute and
  the at least one common hardware attribute is one of the at least two hardware attributes,
  editing of one of the at least two hardware attributes of the designated data object variant within the matching configurations,
  after editing of the data object variant, updating the information on matching groups;
  testing the data object variants by testing the at least one common hardware attribute for the matching groups of the data object variants; and
  based on the results of the testing, integrating the tested data object variants into electronic control unit integrated circuits.

14. The computer aided work environment according to claim 13, wherein the work environment executing on a computer hardware platform is implemented within the software tool or wherein the work environment is implemented executing on a computer hardware platform independent of the software tool when the work environment accesses data object variants of at least two software tools.

15. A computer-implemented method for editing and testing data object variants of electronic control units of at least one software tool executing on a computer hardware platform, the data object variants having at least two attributes, at least one common attribute, and a configuration of the common attribute,
  capturing, for at least one common attribute, matching configurations of the common attribute in different data object variants; and
  storing in a memory, for the common attribute, information on matching groups of the data object variants with the matching configurations of the common attribute,
  wherein the matching groups are lists of the data object variants, each matching group having at least one of the matching configurations,
  wherein the information on matching groups includes the list corresponding to a particular matching group of the matching groups containing the at least one common attribute, and
  wherein the at least one common attribute is included in the at least two attributes;
  editing a designated data object variant of the data object variants by editing at least one of the at least two attributes of the designated data object variant within the matching configurations; and
  after editing of the data object variant, updating the information on matching groups;
  testing the data object variants by testing the at least one common attribute for the matching groups of the data object variants; and
  based on the results of the testing, integrating the tested data object variants into electronic control unit integrated circuits.

16. The computer-implemented method according to claim 15, wherein the common attribute is a hardware attribute or software attribute.

* * * * *